United States Patent [19]

Sletmo

[11] Patent Number: 4,614,112
[45] Date of Patent: Sep. 30, 1986

[54] NAVIGATION INSTRUMENT

[75] Inventor: Lasse Sletmo, Västerås, Sweden

[73] Assignee: Instrumentverken AB, Sollentuna, Sweden

[21] Appl. No.: 688,459

[22] Filed: Jan. 2, 1985

[30] Foreign Application Priority Data

Jan. 2, 1984 [SE] Sweden .................... 8400013

[51] Int. Cl.⁴ .................... G01C 21/00
[52] U.S. Cl. .................... 73/178 R
[58] Field of Search .................... 73/178 R, 178 T; 116/DIG. 43

[56] References Cited

U.S. PATENT DOCUMENTS

| 4,022,150 | 5/1977 | Greene | 73/178 R |
| 4,190,962 | 3/1980 | Lyman, Jr. | 73/178 R |
| 4,236,409 | 12/1980 | Brachet | 73/178 R |
| 4,463,355 | 7/1984 | Schultz | 73/178 R |

FOREIGN PATENT DOCUMENTS

| 2416884 | 10/1974 | Fed. Rep. of Germany . |
| 573916 | 12/1945 | United Kingdom . |
| 599977 | 3/1948 | United Kingdom . |
| 954266 | 4/1964 | United Kingdom . |
| 1591275 | 6/1981 | United Kingdom . |

Primary Examiner—Donald O. Woodiel
Attorney, Agent, or Firm—Ladas & Parry

[57] ABSTRACT

A method of visually reproducing actual and criterion value signals without giving any numerical values includes signal processing of the measuring values forming the basis of the actual value signal, actual and criterion values being fed to a measuring instrument, there to operate at least one indicator (8, 9), the sweep of which defines a surface (S) constituting a measure of the discrepancy between the actual and criterion value signals. The indicator may be of the analogue or quasi-analogue type. Coincidence between actual and criterion signals is indicated by a line, i.e. the surface is reduced to zero.

3 Claims, 4 Drawing Figures

U.S. Patent  Sep. 30, 1986  4,614,112
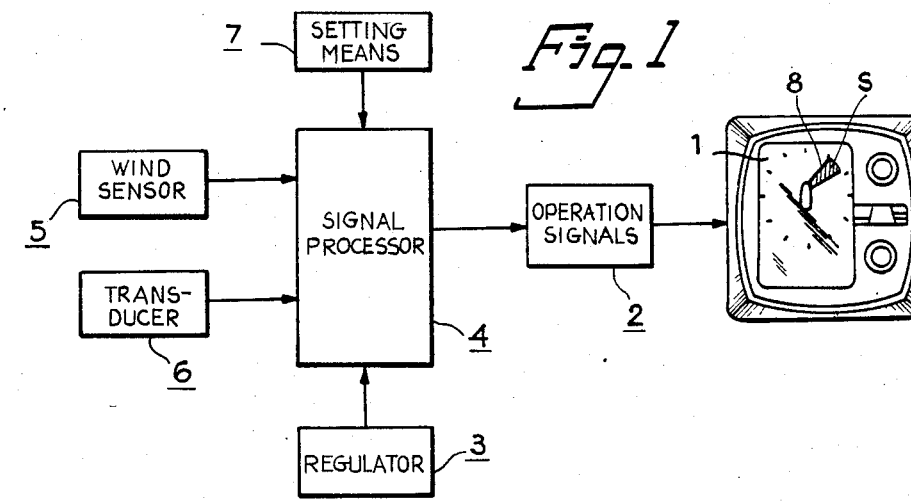
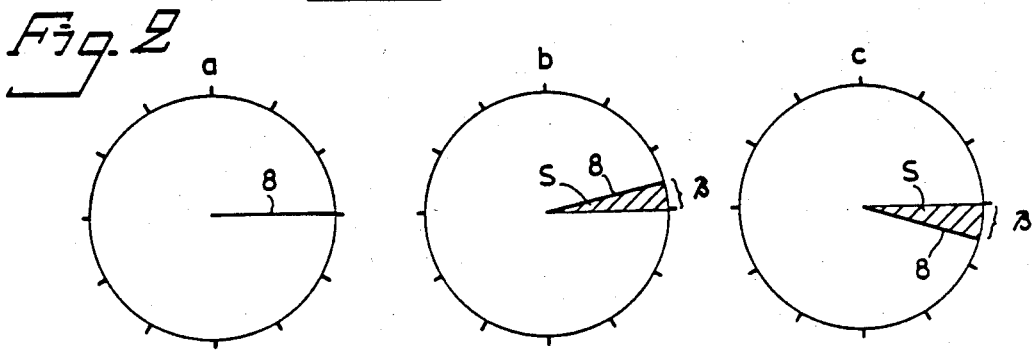
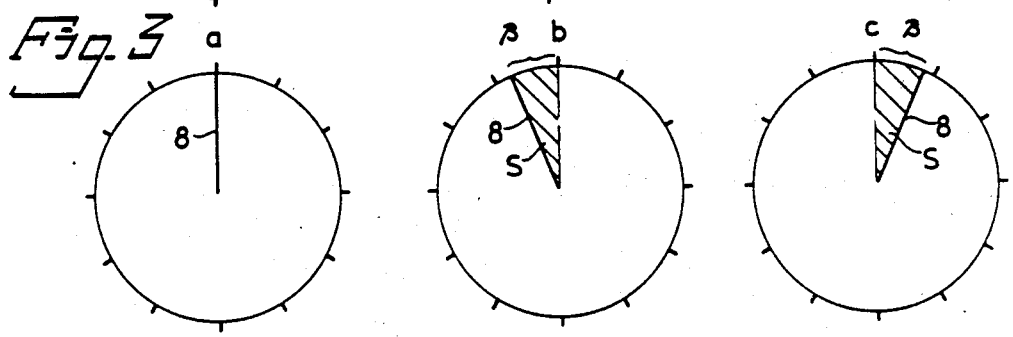
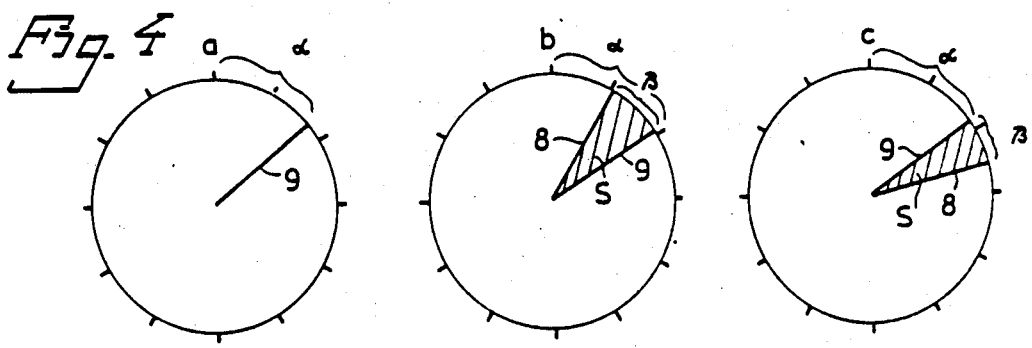

NAVIGATION INSTRUMENT

BACKGROUND OF THE INVENTION

1. Technical Field

The present invention relates to a method and apparatus for indicating with the aid of a measuring instrument, the deviation or discrepancy between actual and criterion values, preferably in setting a course for a vehicle, the instrument having an indicator at least for the criterion value, which consists of one or more measured values, which are dependent on factors affecting the propulsion of the vehicle.

2. Background Art

In navigation there are different aids of both analogue and digital type. Common to the analogue devices is that they are equipped with scales having numerical marking towards which the indicators point. The numerical values pointed out by the indicators then form the basis for assessing the course of the vehicle, and thus the deviation from the desired course. The digital devices often have at least two separate value displays denoting the actual and the desired course, from which the deviation from the latter can be assesed. This deviation is sometimes given directly as a digital difference value display.

The known apparatus for indicating the discrepancy between desired and actual value are thus based on a method where numerical values must be read off for assessing the deviation. It has been found, however, that incorrect readings are easily taken, particularly in situations where the observer is subjected to stress, as with rapidly moving vehicles such as aircraft, or in situations occurring in competion sailing. In such situations there is a risk that even the zero value on a digital difference value display may be incorrectly read, i.e. the zero indicating that the vehicle is on course has been taken to be an 8 instead of a 0, resulting in departure from the correct course.

DISCLOSURE OF INVENTION

There is thus a desire to provide a method of showing deviation which allows depiction without numerals, and which is easy to apprehend. The method and apparatus in accordance with the invention solves the problem at hand by creating an easily apprehended picture as the result of at least one indicator on a measuring instrument reproducing the difference between a set criterion value and the actual value in the form of a visual, surface-defining deflection or sweep.

Although it is possible to allow the surface-defining sweep to have a rectangular shape, it is advantageous to give the surface a sector shape by the respective indicator being an arm which is pivotably mounted in a central point or by its being a quasi-analogue sector-shaped surface marker. An essential feature of the method and apparatus according to the invention is also that when the actual and desired course coincide, this is given as a line.

Further preferred developments of the invention are disclosed in the dependent claims.

In a display device in accordance with the invention, the setable criterion value as well as the measured values can be fed into it in the form of electrical signals in an operation step for the instrument. The measured values may thus consist of signals taken from an anemometer and correction signals from detection means for the speed of the vehicle and from calibration means. The invention will thus be well suited for ship navigation, the signals being processed to advantage by a microprocessor.

PREFERRED EMBODIMENTS

The present invention will now be described in detail in conjunction with a preferred embodiment for the indication of a course on a measuring instrument intended for sailing boats. The description is given with reference to the accompanying drawings, on which FIG. 1 is a block diagram for explaining the basic principle for utilising the measurements affecting the course, these measurements having been converted to electrical signals, FIGS. 2 and 3 illustrate preferred embodiments of a measuring instrument included in the display apparatus in accordance with the invention, and FIG. 4 illustrates an alternative embodiment of the instrument shown in FIGS. 2 and 3.

In FIG. 1 there is a blocka diagram of an electronically operated display apparatus in accordance with the invention. The measuring instrument 1, which will be described in detail in conjunction with FIGS. 2, 3 and 4, is supplied with operating signals A from an operation step 2. This step is adapted for being supplied with an input signal B from a signal processing means 4. Electronic processing of measurement values supplied to it is performed in the means 4. In the present embodiment for a sailing boat these values are obtained from a unit sensing wind strength and direction, which is of a mast, and also from a log transducer sensing the boat speed.

The signal processing unit 4 is also fed with signals from a regulating means 3, used for setting the criterion value, and from a setting means 7, for supplying a coefficient relating to the construction of the boat. The signal generated by the setting means 7 is regulatable.

In different embodiments, there is illustrated in FIGS. 2-4 the principle of the measuring instrument 1 included in the reproduction apparatus. As already mentioned, the invention relates to indicating the deviation from a criterion value. In the case of navigation in connection with sailing boats, which is thus merely one example selected for illustrating the invention, the criterion value mentioned is the tacking angle of the boat.

In a first embodiment of the measuring instrument 1 there is an imagined horizontal reference line, which marks the criterion value/tacking angle. The operation signals A (FIG. 1) are arranged to activate an indicator 8, for giving the actual value. It will be seen from FIG. 2a that the indicator coincides with the horizontal reference line, and thus the desired and actual value. It will be seen from FIGS. 2b and 2c that the indicator 8 has been moved upwards and downwards, respectively, to form a sector surface 5 with the reference line. This sector surface S, i.e. a sweep $\beta$ of the indicator 8 from the horizontal reference line denotes the deviation in question. The size of the sweep $\beta$ and thereby the sector surface S corresponds to the amount of the deviation. In FIG. 2b the desired value is greater than the actual value, while in 2c it is less than the actual value.

An embodiment corresponding to FIG. 2 is illustrated in FIG. 3, where the imagined reference line is vertical, and where FIGS. 3a-3c otherwise correspond to partial FIGS. 2a-2c.

An alternative embodiment of the measuring instrument 1 is depicted in FIG. 4, where the reference line, i.e. the criterion value indication, is not locked in a horizontal or vertical position, but is movable and implemented as a visual indicator 9. There is thus obtained a direct indication of the desired value with this moving criterion value indicator 9. The position of the indicator 9 is affected by the regulating means 3 (FIG. 1) while the indicator 8, as with FIGS. 2 and 3, relates to the actual value.

In FIG. 4a, only the criterion value indicator 9 is "illuminated", since the actual and criterion values coincide here. The partial FIGS. 4b and 4c are to be interpreted in correspondance with what has been said respectively of 2b and 2c. However, in the embodiment according to FIG. 4 the desired (criterion) value α may be read in relation to the zero reference of the measuring instrument, which is here imagined as vertically upwards.

The present invention thus has the following distinguishing features:

It is intended to indicate the deviations of an actual value measured by the system from an adjustable value stored in the system.

The deviation is presented on a measuring instrument of the pointer or indicator type, i.e. a conventional turning coil instrument or a so-called quasi-analogue LCD-type instrument.

Reference and deviation lines are electronically controlled.

The discrepancy between actual and criterion values may either be represented by an indicator moving in relation to a fixed point, where the size and amount of the discrepancy may be read as the distance to the fixed point; or with the aid of two indicators, the criterion value being read from the position of one of them and the deviation from this value being read from the other.

The present invention is primarily intended for electrical instruments in boats, such as anemometers, electronic compasses and autopilots, but may just as well relate to other applications where electronic measuring instruments are used.

As already mentioned above, the surface defined by the indicators does not necessarily need to be sector-shaped, but may, for example, be rectangular between two parallel arms, or be formed by rectangular quasi-analogue elements. As examples of quasi-analogue elements, further to the liquid crystals already discussed, may be mentioned LED's, electronically implemented scales and video screens.

The invention may therefore not be regarded as limited to the embodiments and applications described hereinbefore and illustrated on the accompanying drawings but solely by the scope of the following claims.

What is claimed as new and desired to be secured by Letters Patent of the United States:

1. A navigation instrument for boats and comprising a measuring instrument (1) responding to at least an elecrical actual value signal and having indicator means (8, 9) arranged to visually indicate said actual value as a sector surface (S), the navigation instrument being characterized in that said indicator means (8, 9) is implemented as quasi-analogue elements, preferably in form of liquid crystal type, the actual value being obtained from a microprocesor (4) supplied with at least a measured value and being connected to said measuring instrument (1) through an operation step (2) for said quasi-analogue elements to turn some of the elements on in dependent on the output from the microprocessor to form an actual value indicator (8) starting from a point at the measuring instrument (1) said point being common to an imaginary criterion value indicator or to a criterion value indicator (9) formed by quasi-analogue elements turned on dependent on an electric criterion value signal obtained from a criterion value source (3) and supplied to the measuring instrument (1) via the microprocessor (4) and the operation step (2), said indicator (8, 9) forming the borders for said sector surface (S) the area of which being proportional to the course deviation ($\beta$) of the boat.

2. An instrument as claimed in claim 1 characterized in that one of said measuring values is generated by an anemometer (5) and the criterion value consists of a signal obtained by setting on a regulating means (3) the desired course of the boat, said anemometer as well as said regulating means being connected to the microprocessor (4).

3. An instrument as claimed in claim 2, characterized in tha said microprocesor (4) is fed with further actual value affecting signals from a log transducer (6), the output of which indicating the boat speed, and from a setting device (7) the output of which is a coefficient relating to the boat construction.

* * * * *

UNITED STATES PATENT AND TRADEMARK OFFICE
CERTIFICATE OF CORRECTION

PATENT NO. : 4,614,112
DATED : September 30, 1986
INVENTOR(S) : Lasse SLETMO

It is certified that error appears in the above-identified patent and that said Letters Patent is hereby corrected as shown below:

Title page:

Item 30 Foreign Application Priority Data which reads "8400013" should read -- 8400013-2 --.

Column 1, line 34 which reads "competion" should read -- competition --.

Column 2, line 20 which reads "blocka" should read -- block --.

Signed and Sealed this

Tenth Day of January, 1989

Attest:

*Attesting Officer*

DONALD J. QUIGG

*Commissioner of Patents and Trademarks*